March 6, 1962 T. G. BRASHEAR, SR 3,024,353
CURRENT CONTROLLABLE ALTERNATING CURRENT RELAY CIRCUIT
Filed July 17, 1959
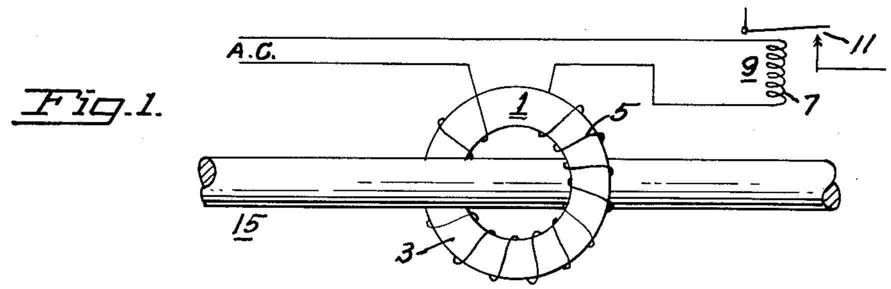
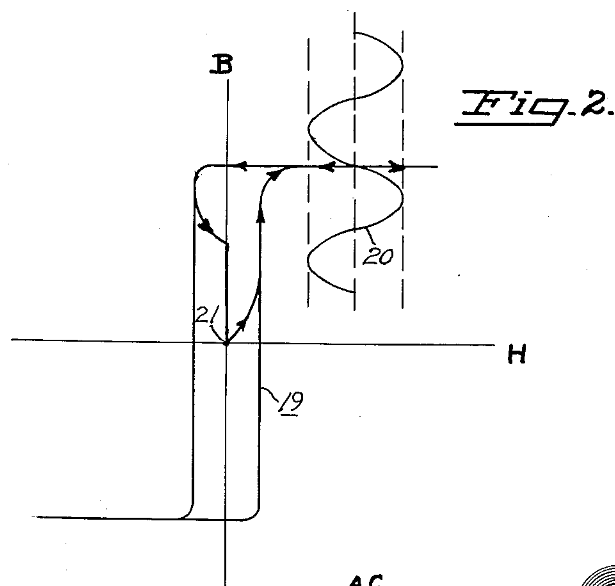
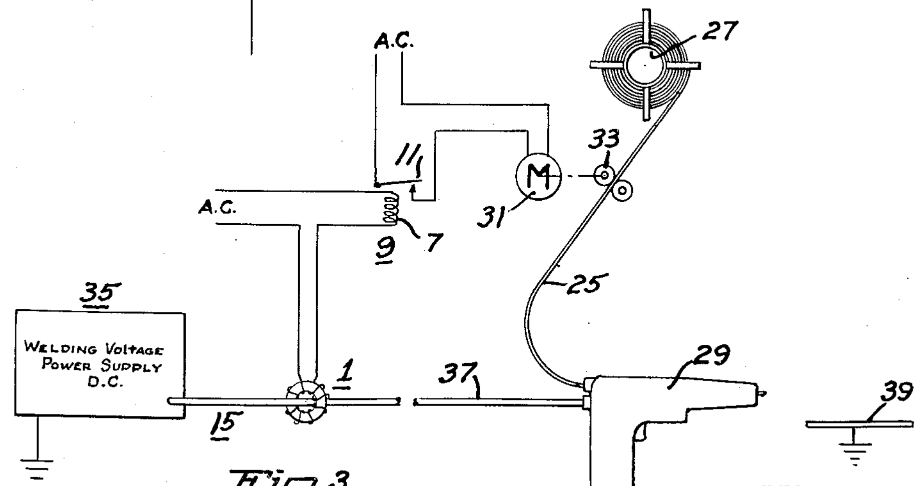
INVENTOR.
TURNER G. BRASHEAR, SR.
BY
Bruce & Brosler
HIS ATTORNEYS.

United States Patent Office 3,024,353

Patented Mar. 6, 1962

1

3,024,353

CURRENT CONTROLLABLE ALTERNATING CURRENT RELAY CIRCUIT

Turner G. Brashear, Sr., El Cerrito, Calif., assignor to L & B Welding Equipment, Inc., a corporation of California Filed July 17, 1959, Ser. No. 827,810

3 Claims. (Cl. 219—130)

My invention relates to welding and more particularly to the control of an alternating current relay by current in a control circuit, and applicable to automatic and semi-automatic welding.

In automatic and semi-automatic welding, the welding electrode is in the form of a wire supplied to the work from a reel by a drive motor and at a rate commensurate with the rate of consumption of the welding wire. The drive motor is automatically connected in circuit upon establishing contact between the electrode wire and the work, and this is accomplished by means of a circuit involving an alternating current relay which is energized in response to the welding current developed when such contact is established.

The present invention, while of general utility, is applicable to advantage for such control in welding systems, and has among its objects:

(1) To provide a novel and improved current controllable alternating current relay circuit;

(2) To provide a novel and improved current controllable alternating current relay circuit, operative down to low values of control current;

(3) To provide a novel and improved current controllable alternating current relay circuit which is short and positive in its action;

(4) To provide a novel and improved current controllable alternating current relay circuit which will minimize chattering of the relay contacts; and (5) To provide a novel and improved current controllable alternating current relay circuit which, aside from the relay, is free of moving or vibrating parts and is otherwise extremely simple and rugged.

Additional objects of my invention will be brought out in the following description of a preferred embodiment of the same, taken in conjunction with the accompanying drawings wherein;

FIG. 1 is a circuit illustrative of the invention in its basic form;

FIG. 2 is a diagram depicting characteristics of the circuit of FIG. 1, with direct current flowing in the control circuit; and FIG. 3 is a schematic showing of a system involving semi-automatic welding and illustrating the application of the present invention thereto.

Referring to the drawings for details of my invention in its preferred form, the same comprises a saturable core reactor 1 including a toroidal core 3 of magnetizable material and a winding 5 on said core which is connected in series with the winding 7 of an A.C. relay 9 to be controlled, such relay having, in the present instance, a pair of normally open contacts 11 associated with the winding thereof.

The relay is adapted to function when the voltage thereacross exceeds a predetermined threshold value, and de-energize to release its contacts when the relay voltage drops below such threshold value.

The resistance of the saturable core reactor winding 5 should be appreciably smaller than the 60 cycle impedance of the relay winding 7 while the saturable core reactor in a low flux condition has an impedance at 60 cycles sufficiently high to limit the voltage across the relay winding to a value below the threshold value, and in

2 its saturated condition having a resistance sufficiently low to cause the voltage across the relay winding to increase to a value above the threshold value and cause the relay to become energized and function.

The minimum flux condition of the reactor is determinable primarily by alternating current that flows in the relay circuit, while the saturation condition of the saturable core reactor is determined by the addition of flux created by a direct current circuit 15 which is the control circuit, linking the reactor core, whereby the instantaneous flux condition of the core will be due to the combined effect of the ampere turns of the control circuit 15 and the instantaneous ampere turns of the winding 5 in the relay circuit.

To be effective, therefore, the amplitude of the alternating current in the relay circuit should be insufficient to cause saturation of the core, while the magnitude of the direct current in the control circuit should be sufficient to maintain saturation of the core even for the highest opposing instantaneous value of alternating current in the relay circuit.

It will thus be apparent that with little or no current flowing in the control circuit, the impedance drop across the saturable core reactor in the relay circuit will be sufficiently great, that the voltage drop across the relay will be at a value below the threshold value necessary to cause the relay to function.

Further, with sufficient additional ampere turns produced by the direct current of the control circuit, when flowing therein to produce a condition of saturation only a resistance drop will appear across the saturable core reactor in the relay circuit, and this will be insufficient to drop the voltage across the relay winding below the threshold value, thus causing the relay to function.

The core of the saturable reactor when of an alloy of substantially equal parts of iron and nickel, will have a very steep saturation curve characteristic 19 such as depicted in FIG. 2 whereby the flux in the core, instead of building up to saturation along a sloping curve, will substantially trigger itself when the direct current in the control circuit reaches a value at which the core will saturate practically instantaneously. The magnetic force due to the relay current is depicted by a sinusoidal curve 20, the distance from the B axis being determined by the direct current in the control circuit.

Upon removal of the direct current from the control circuit, the alternating current in the relay circuit will then oscillate about the origin 21 and will immediately de-saturate the core to a low value of flux and thereafter produce low alternating fluctuations in the flux content of the core. The sudden de-saturation of the core immediately restores the high impedance drop across the saturable core reactor to thereby cause the relay to de-energize and its contacts to drop out, while the alternating fluctuations thereafter produced by the alternating current in the relay circuit will be of insufficient magnitude to upset prevailing conditions.

Under the foregoing conditions, the operation of the relay is sharp and positive with no chance of the relay contacts chattering as when the characteristic curve of the core material is such that the flux builds up gradually, for a relay when exposed to a gradual change in applied voltage, its contacts are apt to chatter before the voltage reaches a value at which the contacts will hold.

The higher the direct current in the control circuit, the less the number of turns required to link the core of the saturable core reactor to obtain a predetermined number of turns. This fact renders the present invention particularly applicable to welding systems of the automatic or semi-automatic type wherein the starting and stopping of the feed of the welding wire to the work must be accurately correlated to the starting and stopping of a welding operation.

In such system, welding wire 25 is normally supplied from a reel 27 to a gun 29, the feed of such wire being controlled from a drive motor 31 coupled to feed rolls 33 engaging such wire. Welding voltage is supplied to the welding wire through the gun from a direct current power supply 35, one side of which is grounded, while the other side of the power supply is connected through the gun to the welding wire by means of a cable 37. Upon contacting the work 39 with the gun to initiate a welding arc, a current flows through the cable. This is sufficient to establish the ampere turns necessary to activate the relay, when the cable 37 is run through the core of the saturable core reactor, which is the equivalent of a single turn. Thus, by connecting the drive motor to a power source through the contacts 11 of the relay, the drive motor will immediately become energized and will start feeding the welding wire to the work.

By the same token, upon extinguishing the arc, the contacts of the relay will immediately drop out, thus de-energizing the drive motor.

From an analysis of the curves of FIG. 2, it becomes apparent that the lower the value of alternating current flowing in the relay circuit, the lower will be the control current required to effect and maintain saturation of the saturable core.

While the preferred form of the invention described above utilizes direct current for the control current, it has been found that alternating current in the control circuit, if properly phased, can be utilized. What this means in actual operation, is that if the system doesn't function, the alternating current in the relay circuit and the alternating current in the control circuit are in bucking relationship and that by merely reversing the power leads in one of the circuits, preferably, the plug connection to the A.C. lines in the relay circuit, proper phasing will be realized.

From the foregoing description of my invention in its preferred form, it will become apparent that the same is subject to alteration and modification without departing from the underlying principles involved, and while I have illustrated and described the invention in considerable detail, I do not desire to be limited in my protection to such details except as may be necessitated by the appended claims.

I claim:

1. In combination, a welding circuit of the type comprising a gun, a supply of welding wire, feed motor drive means for feeding said wire through said gun toward work to be operated on, and a direct current circuit including a direct current source, current conductive means from said direct current source to said gun for electrically contacting said welding wire as it passes through said gun; and means for energizing said feed motor drive means in response to closing of said direct current circuit, said means including a current controllable alternating current relay circuit comprising an alternating current relay including a high impedance relay winding adapted to activate a circuit including said feed motor drive means at an applied voltage to said winding above a threshold value; and a saturable core reactor including only a single core of magnetizable material magnetically linked to said current conductive means, and a winding on said core of lower resistance than that of said relay winding connected in series with said relay winding, said relay circuit being open for connection to a source of alternating current and said saturable core reactor, in its minimum flux condition having an impedance to an alternating current at the prevailing frequency of such source, sufficient to limit the voltage across said series connected relay winding to some value below said threshold value and in its saturated condition having a resistance sufficiently low to raise the voltage across said relay winding to a value above said threshold value, the impedance of said relay winding being such that said saturable code reactor is unsaturated in response to relay current alone and in absence of said threshold value of said voltage, and said direct current having a value sufficently high to saturate said saturable core reactor for all instantaneous values of said relay current.

2. A current controllable alternating current relay circuit comprising an alternating current relay including a relay winding adapted to actuate said relay at an applied voltage above a threshold value; and a single saturable core reactor including only a single core of magnetizable material having approximately equal parts of iron and nickel, and a winding on said core of lower resistance than that of said relay winding connected in series with said relay winding, said relay circuit being open for connection to a source of alternating current and said saturable core reactor, in its minimum flux condition having an impedance at the frequency of said source sufficient to limit the voltage across said series connected relay winding to some value below said threshold value and in its saturated condition having a resistance sufficiently low to raise the voltage across said relay winding to a value above said threshold value, the impedance of said relay winding being such that said saturable core reactor is unsaturated in response to relay current alone and in absence of said threshold value of said voltage, and said direct current having a value sufficiently high to saturate said saturable core reactor for all instantaneous values of said relay current.

3. A current controllable alternating current relay circuit comprising an alternating current relay including a relay winding adapted to actuate said relay at an applied voltage above a threshold value; and a single saturable core reactor including only a single toroidal core of magnetizable material having approximately equal parts of iron and nickel, and a winding on said core of lower resistance than that of said relay winding connected in series with said relay winding, said relay circuit being open for connection to a source of alternating current and said saturable core reactor, in its minimum flux condition having an impedance at the frequency of said source sufficient to limit the voltage across said series connected relay winding to some value below said threshold value and in its saturated condition having a resistance sufficiently low to raise the voltage across said relay winding to a value above said threshold value, the impedance of said relay winding being such that said saturable core reactor is unsaturated in response to relay current alone and in absence of said threshold value of said voltage, and said direct current having a value sufficiently high to saturate said saturable core reactor for all instantaneous values of said relay current.

References Cited in the file of this patent

UNITED STATES PATENTS

| | | |
|---|---|---|
| 2,059,057 | Suits | Oct. 27, 1936 |
| 2,676,284 | Bechberger | Apr. 20, 1954 |
| 2,721,249 | Landis | Oct. 18, 1955 |
| 2,810,840 | McFarland | Oct. 22, 1957 |
| 2,929,963 | Kaestle | Mar. 22, 1960 |

FOREIGN PATENTS

| | | |
|---|---|---|
| 218,495 | Switzerland | Apr. 1, 1942 |